United States Patent [19]

Luckevich

[11] Patent Number: 5,064,783
[45] Date of Patent: Nov. 12, 1991

[54] PRODUCTION OF SPHERICAL CERAMIC POWDERS

[75] Inventor: Lydia M. Luckevich, Etobicoke, Canada

[73] Assignee: Ortech International, Mississauga, Canada

[21] Appl. No.: 520,769

[22] Filed: May 8, 1990

[30] Foreign Application Priority Data

Aug. 1, 1989 [GB] United Kingdom .................. 8917456

[51] Int. Cl.$^5$ ............................................. C03C 3/145
[52] U.S. Cl. ...................................... 501/12; 423/628; 502/8
[58] Field of Search .............. 501/12; 502/8; 423/625, 423/628

[56] References Cited

U.S. PATENT DOCUMENTS

| | | | |
|---|---|---|---|
| 3,943,070 | 3/1976 | Mitsche | 252/448 |
| 3,993,589 | 11/1976 | Andre et al. | 252/429 R |
| 4,273,735 | 6/1981 | Jaques et al. | 264/5 |
| 4,318,896 | 3/1982 | Schoonover | 423/628 |
| 4,911,903 | 3/1990 | Unger et al. | 423/335 |

*Primary Examiner*—William R. Dixon, Jr.
*Assistant Examiner*—Chris Gallo
*Attorney, Agent, or Firm*—Sim & McBurney

[57] ABSTRACT

A sol-gel method is employed to produce ceramic oxide spheres from precursors thereto. An alkanol of the sol precursor(s) is introduced to an immiscible hydrophilic liquid phase to cause spheroidizing of the sol. Moisture, which initially may be present in the immiscible liquid or may subsequently be added, is employed to effect hydrolysis of the precursor to oxide form. The ceramic oxide spheres are recovered from the liquid phase and calcined to their final form.

17 Claims, No Drawings

PRODUCTION OF SPHERICAL CERAMIC POWDERS

FIELD OF THE INVENTION

The present invention is directed to the production of ceramic spheres using a sol-gel method. More particularly the present invention is directed towards the production of high performance ceramic powder spheres by way of sol-gel synthetic methods using polymerized alkoxides or similar ceramic precursors.

BACKGROUND OF THE INVENTION

Chemical methods of ceramic powder synthesis have been increasing in prominence in recent years because of their potential to produce homogeneous powders with controlled particle size and morphology. The majority of work using polymerized alkoxides has been done not for polycrystalline ceramics or powders but in silica or high silica glasses for optical fibre applications.

The principle behind sol-gel synthetic methods using polymerized alkoxides is basically a decomposition-recomposition reaction. Metal alkoxides (metal-organic precursors) are partially hydrolyzed or decomposed, then are recombined by polymerization or condensation to form a metal-oxygen-metal bond. An example of this technology is found in the use of aluminum isopropoxide to form alumina. Aluminum alkoxide is added to water with stirring, and hydrolysis begins. Typically a sol is stabilized by acid addition and heating, the solution then is gelled and fired to yield a solid alumina body.

SUMMARY OF THE INVENTION

In accordance with the present invention, a novel method of producing ceramic spheres suitable for calcination to ceramic powders is provided, which comprises contacting an anhydrous alkanol sol of at least one ceramic oxide precursor with liquid with which said sol is immiscible to form spheres of said sol in said immiscible liquid.

In accordance with an aspect of the present invention a novel method of producing ceramic spheres is provided wherein an anhydrous alkanol-based hydrophobic sol containing at least one ceramic oxide precursor is contacted with a liquid with which the sol is immiscible to form spheres of the sol in the immiscible fluid. The ceramic oxide precursor then is hydrolyzed to form ceramic oxide spheres resulting in an amorphous powder with spherical morphology. The ceramic spheres so produced are recovered from the liquid, by filtration or other suitable method, and calcined to form a final ceramic powder.

The spheroidizing and hydrolyzing steps preferably are effected simultaneously employing an immiscible hydrophilic spheroidizing medium. Alternatively, the spheroidizing and hydrolyzing steps may be effected sequentially.

The present invention permits the preparation of spherical particles of any size ranging from sub-micron size to large spherical particles (>1 mm) out of structural ceramics and the application of this technology to the synthesis of hollow spheres from electronic or functional ceramic materials. The latter materials may be used as piezoelectric materials for transducer and/or sonar applications.

GENERAL DESCRIPTION OF INVENTION

In the present invention, ceramic oxide spheres are formed from an anhydrous alkanol-based hydrophobic sol containing at least one ceramic oxide precursor and often a mixture of such precursors. For example, for producing transformation toughened alumina, a mixture of aluminum-tri-sec-butoxide and zirconium n-butoxide may be employed. The ceramic oxide precursor may be any suitable precursor which, when moistened, produces the ceramic oxide. Alkoxides are the preferred precursors.

Two main considerations were focussed upon in developing the preferred embodiments of the present invention:

(1) the sol is stable for a prolonged period (up to many months); and (2) the powder preparation method should use properties of the solvents and liquids employed to promote the production of spherical particles.

The first consideration was addressed by making the sol anhydrous and hydrophobic thereby limiting the hydrolysis of the ceramic precursor upon storage.

The second consideration was addressed by using the property of immiscible liquids, i.e. emulsions. In such systems, energy is minimized by minimizing the contact area between immiscible liquids. A spherical particle or droplet is the morphology at which the surface area to volume ratio is at a minimum, thus minimizing the contact area between the two liquids and consequently the energy of the system.

Figure 1:
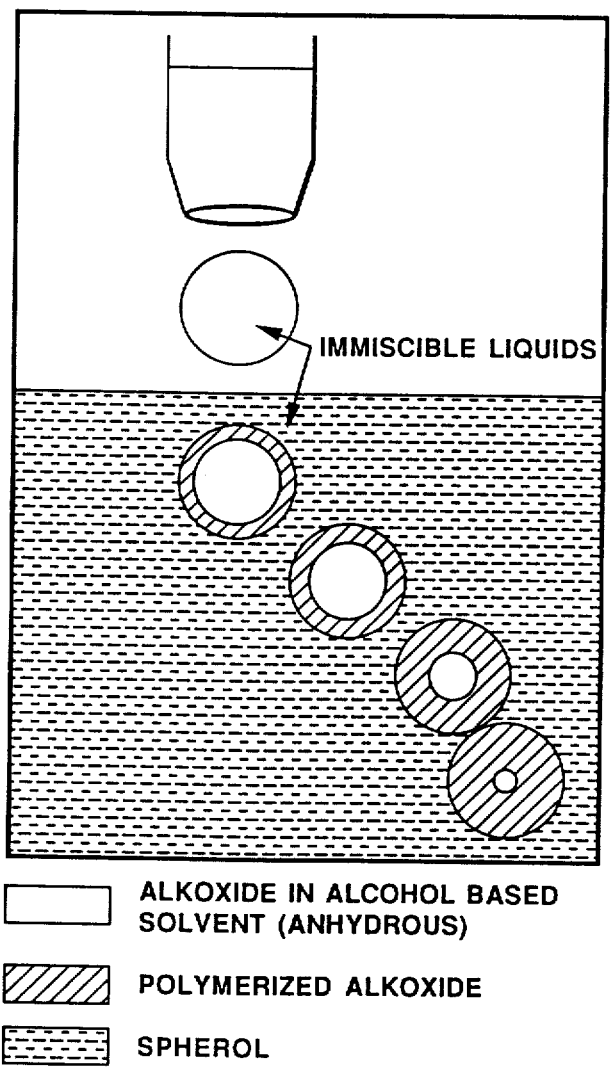
FIG. 1 is a schematic illustration of a spheroidizing-/polymerization process for forming ceramic spheres in accordance with one embodiment of the invention.
Figure 2:
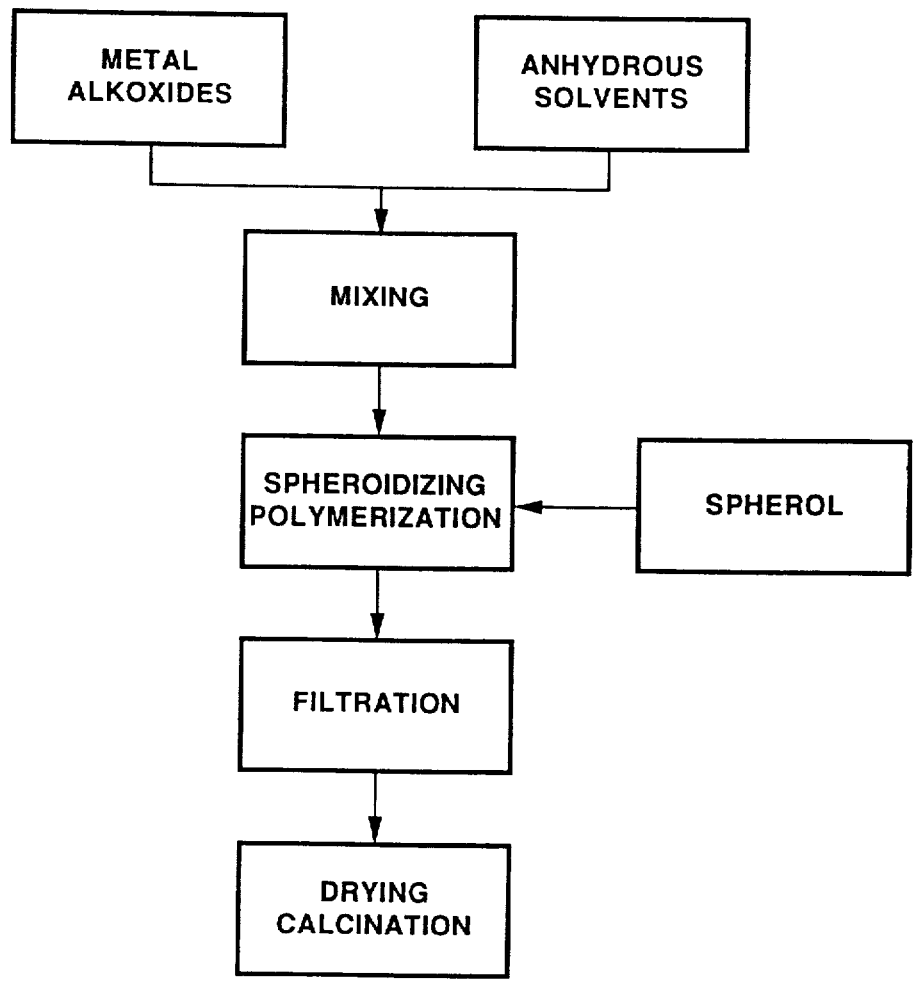
FIG. 2 is a schematic flow sheet for a process for forming ceramic spheres in accordance with one embodiment of the invention.

The properties of ceramic oxide particles in accordance with a preferred embodiment of the invention is shown in the schematic illustration of FIG. 1 and the process flow sheet of FIG. 2.

Generally, in the sol preparation stage, the sol is prepared by dispersing particles of the ceramic oxide precursor of colloidal particle size in the hydrophobic solvent. The solvent comprises at least one alkanol, for example, isobutanol, generally along with an organic hydrocarbon solvent, such as toluene, to render the solvent highly hydrophobic. The sol is maintained anhydrous until spheroidizing is effected.

An important aspect of the present invention is that the moisture content in the sols is maintained low until ceramic oxide particles are to be formed from the sol, to minimize hydrolysis of the ceramic oxide precursors. To achieve this result, a dehydrating molecular sieve or other suitable desiccant may be added to maintain a low moisture content in the sol, particularly where long term storage is desirable.

The concentration of ceramic precursor in the sol may vary widely. Successful sphere formation may be achieved at an alkoxide concentration from about 1 to about 80 wt. %. The spheres tend to increase in size and decrease in number as the concentration of precursor increases.

The concentration of alkanol present in the sol also may vary widely. Successful sphere formation may be achieved at a concentration of about 20 to about 99 wt. %. The spheres tend to decrease in size and increase in number as the concentration of alkanol increases.

The hydrophobic solvent component of the sol also may vary widely in concentration. Spheres may be formed at concentrations from about 12 to about 40 wt. %. The spheres tend to increase in size and decrease in number as the concentration of hydrophobic solvent increases.

In the powder preparation step, the sol is reacted with a liquid in which the sol is immiscible and which is hydrophilic. To effect such reaction, the sol is most conveniently introduced in droplet form, to a continuous phase of the immiscible hydrophilic liquid, as illustrated in FIG. 1, whereby the immiscible liquid provides a spheroidizing effect on the sol droplet. The metal alkoxide in the sol droplets is partially hydrolyzed by water present in the hydrophilic liquid and the hydrolysis product then recombines by polymerization or condensation to form a metal-oxygen-metal bond in ceramic oxide particles which result.

The spheroidizing hydrophilic liquid is a liquid immiscible with the liquid phase of the sol and contains water. Sphere formation has been found to be independent of water concentration in the immiscible liquid. The rate of hydrolysis and the physical stability of the spheres, however, tend to depend on water concentration. Generally, the aqueous component may comprise less than ½ to about 5 wt. % of immiscible liquid.

The combination of the hydrophobic nature of the sol, the immiscibility of the liquids and the presence of water in the hydrophilic liquid ensures that fine powder particles of ceramic are formed.

In a modification to the above described process, the spheroidizing and hydrolysis may be effected sequentially rather than simultaneously. In this modification, the sol also may be introduced initially into dry immiscible liquid, which effects the spheroidizing and yields unreacted spherical droplets of sol. These droplets then are contacted with water, such as by introducing water to the immiscible liquid, ceramic precursor in the spheres of sol hydrolyses and the droplet/liquid interface rigidizes. This modification has the advantage of decreasing the volumes of non-alkoxide components required to prepare the powders.

Common mixed oxide ceramics used for structural applications include alumina, Transformation Toughened Alumina (TTA), Partially Stabilized Zirconia (PSZ), mullite, cordierite and spinel. Any of these materials may be formed from suitable alkoxide precursors prepared in accordance with the process of the present invention.

It is appreciated that the present invention has a number of useful applications, including its suitability for space (zero gravity) production of high performance ceramic ball bearings. The stability of the anhydrous sol prior to reaction with a suitable polymerizing agent is advantageous in these applications.

DESCRIPTION OF PREFERRED EMBODIMENT

In one preferred embodiment, Transformation Toughened Alumina (TTA) was synthesized, details of such synthesis appearing in the Examples below. TTA is alumina dosed with zirconia as a toughening agent. There are two main steps involved in making the precursors for TTA, the first being synthesis of a stable sol containing the precursors required (sol preparation stage), and the second being preparation of a powder through reaction of this sol with the liquid (powder preparation stage). TTA is then prepared by heat treatment of the powder formed.

TTA, like other common mixed oxide ceramics for use in structural applications, uses ceramic precursor alkoxides which are highly reactive and to-date have resulted in sols with high moisture sensitivity. As such, the reactions have been difficult to control. The anhydrous sols of the present invention overcome this problem and permit the development of a reliable reproducible method for the production of ceramic oxide structural spheres of TTA. The anhydrous sols of the present invention not only enhance the reliability and reproducibility of the sol-gel methodology employed herein but are also stable for long periods of time (on the order of months).

In a preferred embodiment for the preparation of TTA, the sol components are aluminum-tri-sec-butoxide, zirconium-n-butoxide, isobutanol and toluene. The amount of each alkoxide is selected to yield an $Al_2O_3$:$ZrO_2$ ratio of about 9:1. This corresponds with the midrange of ratios commonly used in TTA synthesis via conventional dry mixing routes. The isobutanol concentration was selected to be the lowest which yielded intact spherical particles, namely about 45 wt. % isobutanol in the sol. The toluene concentration, also was the lowest which yielded mainly intact spherical particles, namely about 17 wt. %. It is desirable to have the sol as concentrated as possible to minimize solvent evaporation and particle shrinkage.

In this preferred embodiment for the preparation of TTA, the dry alcohol/toluene-based sol was added to an immiscible wet solvent, namely SPHEROL ™.

Figure 3:
FIG. 3 is a scanning electron photomicrograph (SEM) of a first sample of ceramic spheres produced using the process of FIGS. 1 and 2.
Figure 4:
FIG. 4 is a scanning electron photomicrograph (SEM) of a second sample of ceramic spheres produced using the process of FIGS. 1 and 2.

SPHEROL is a trade mark for a proprietary mixture containing mainly acetonitrile, along with toluene isopropanol, ethanol and water. In this preferred embodiment, it was noted that the addition of toluene to the sol to make it strongly hydrophobic is an important aspect of this invention. The strongly hydrophobic nature of the toluene combined with keeping the sol dry allowed for a highly reactive and successful formation of ceramic particles during the powder preparation stage. As shown in the SEM photographs in FIGS. 3 and 4, micron and sub-micron sized spheres were produced. The ratio of sol to spheroidizing liquid is best kept to a minimum to maintain total volumes, cost and solvent recovery systems at a minimum. For the formation of TTA, a volume ratio of 10:1 (SPHEROL to sol) is preferred.

Toluene is extremely non-polar and is an important component in making toughened alumina spheres. Toluene makes the sol less polar and enhances sphere formation in the TTA system. The usefulness of toluene to enhance sphere formation and/or size depends on the ceramic precursors used.

Other ceramics, in addition to Transformation Toughened Alumina (TTA), have potential application as structural ceramics. These include mullite ($3Al_2O_3 \cdot 2SiO_2$), cordierite ($xMgO \cdot yAl_2O_3 \cdot zSiO_2$) and spinel ($MgO \cdot Al_2O_3$). In addition, hollow electronic ceramic spheres have potential for use as magnetic devices. Barium titanate ($BaTiO_3$) is an example of an electronic ceramic.

EXAMPLES

Example 1

This Example illustrates the use of aluminum-tri-sec-butoxide and tetraethylorthosilicate to form mullite ceramic particles.

Aluminum-tri-sec-butoxide was diluted with isopropanol to form a slightly hazy mixture. Tetraethylorthosilicate (TEOS) was diluted with dry ethanol. A precipitate formed immediately upon addition of the aluminum-tri-sec-butoxide mixture to the stirred TEOS mixture. After ½ hour of stirring, the precipitate was stored overnight, refluxed at ~86° C. under a nitrogen atmosphere for about 6 hours, cooled and stored in a stoppered flask. The resulting sol (sol number 25) was still slightly hazy.

The powder was prepared by injecting droplets of the sol into stirred, wet SPHEROL (150 mL). Stirring was continued for 5 minutes. The resulting powder was filtered, washed with acetone and dried.

Figure 5A:
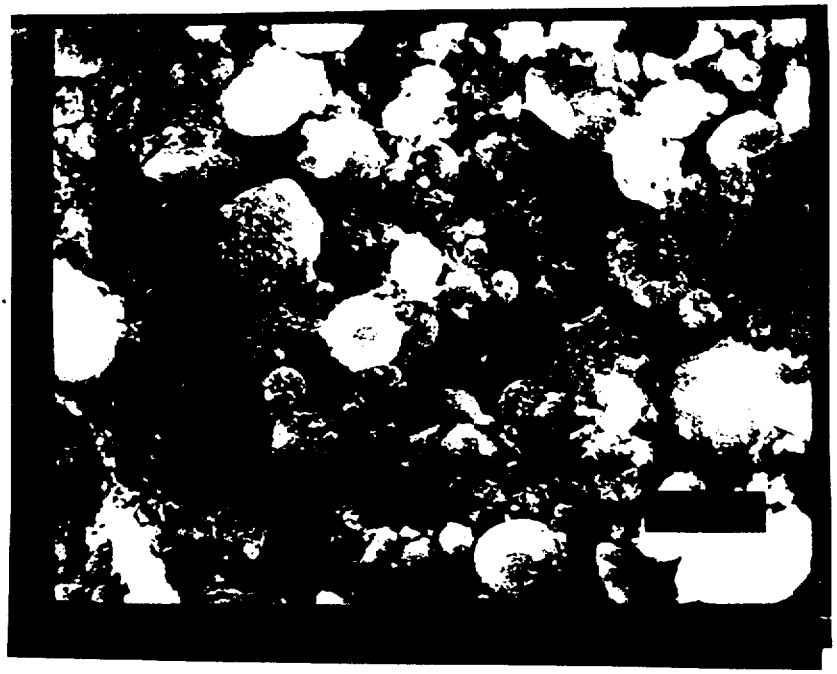
FIG. 5 is a scanning electron photomicrograph (SEM) of a third sample of ceramic spheres using the process of FIGS. 1 and 2.
Figure 5B:
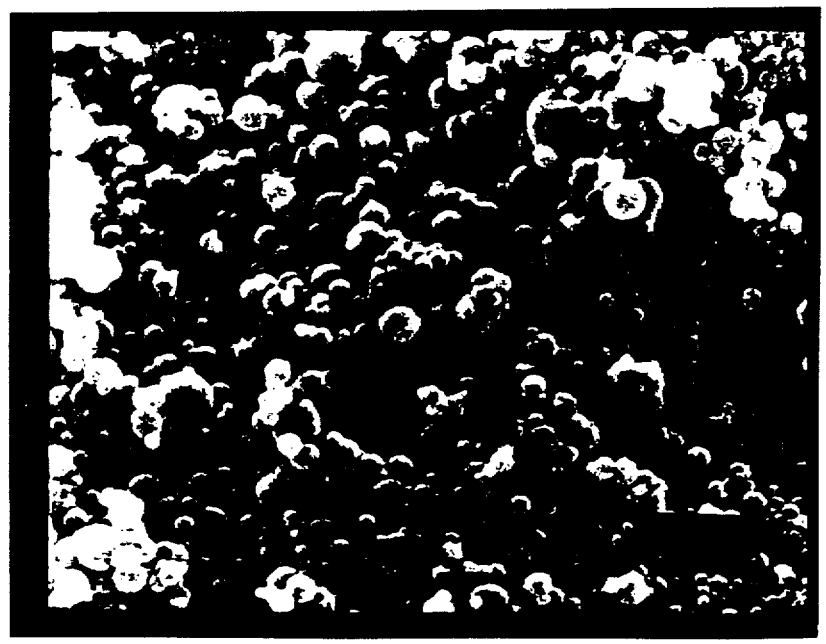
Figure 5C:
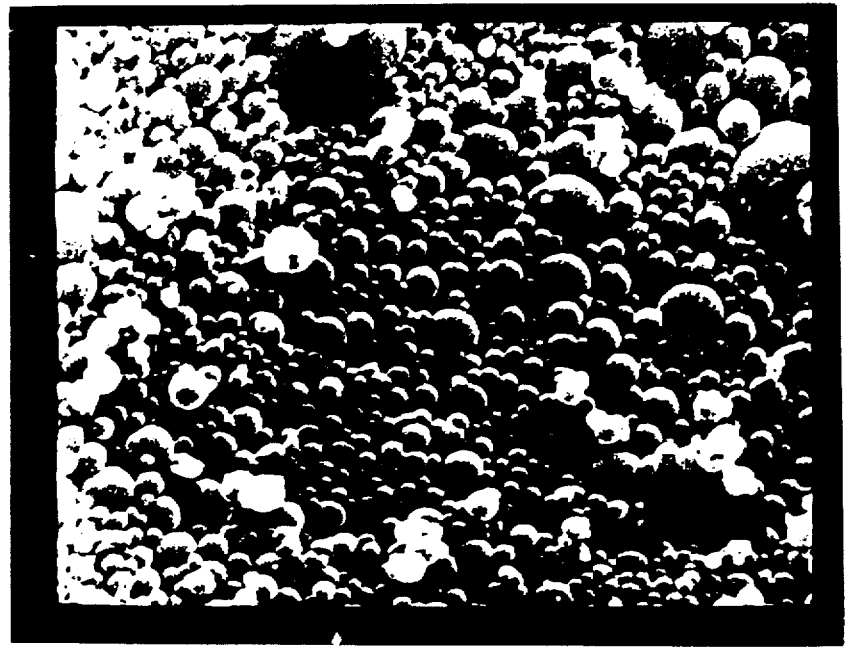

Optical microscopy examination of the powder revealed several spheres of various sizes (16 to 54 μm in diameter). SEM examination revealed large spheres and lumps of powder at low magnifications. High magnification showed the powder lumps consist of tightly-packed sub-micron spheres. SEM photographs are shown in FIG. 5.

Example 2

This Example illustrates the preparation of ceramic powders of cordierite ($xMgO \cdot yAl_2O_3 \cdot zSiO_2$) and spinel ($MgO \cdot Al_2O_3$) Anhydrous sols containing cordierite and spinel precursors were provided by UES of Dayton, Ohio. The powders were prepared by injecting sol into stirred, wet SPHEROL. Upon completion of sol addition, the mixture was stirred for 5 minutes. The resulting powder was filtered, washed with acetone and dried.

Figure 6A:
FIG. 6 is a scanning electron photomicrograph (SEM) of a fourth sample of ceramic spheres using the process of FIGS. 1 and 2.
Figure 6B:
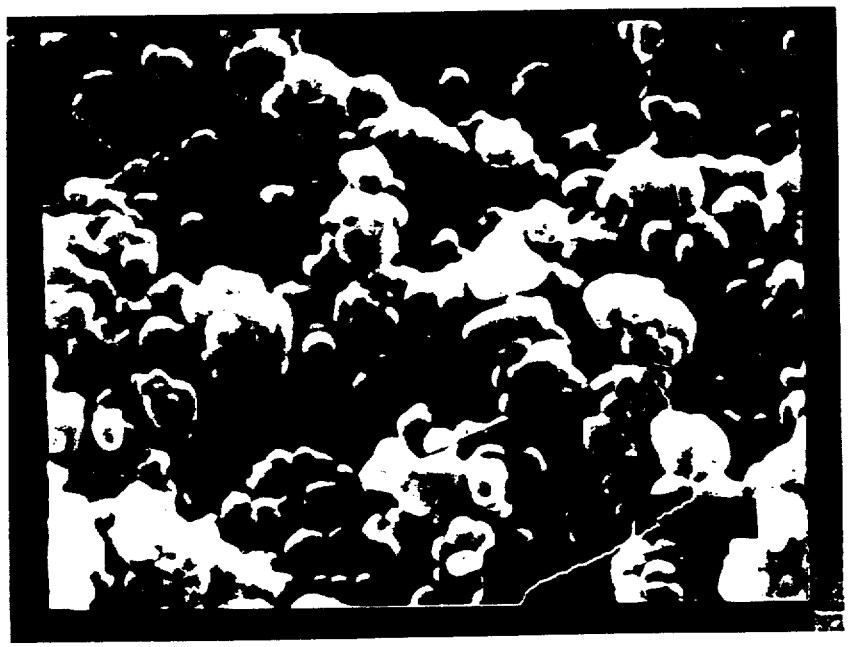
Figure 7:
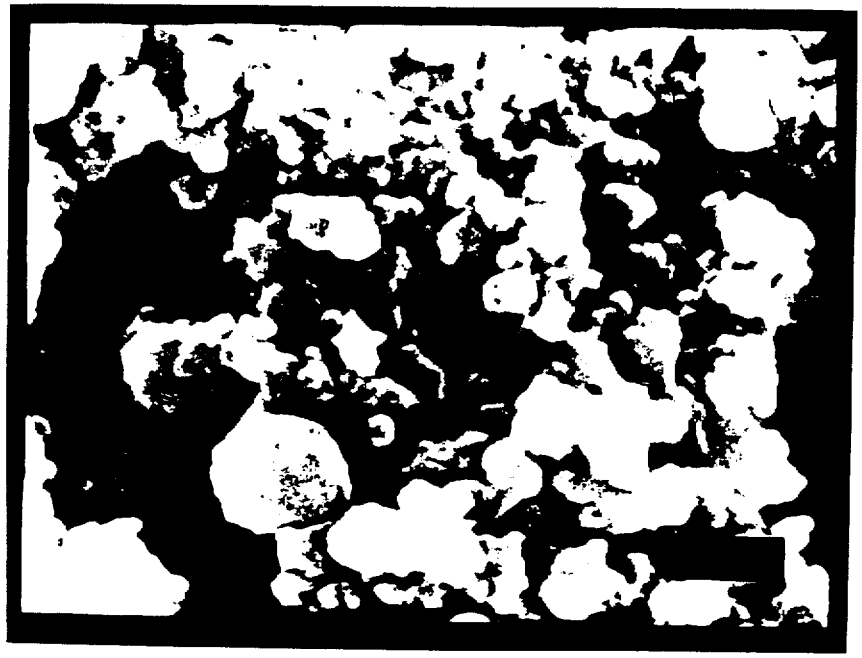
FIG. 7 is a scanning electron photomicrograph (SEM) of a fifth sample of ceramic spheres using the process of FIGS. 1 and 2.

The dried powders were examined using optical microscopy and SEM. The microscopy observations are given in Table 1, below. SEM photographs of the products are shown in FIGS. 6 and 7.

TABLE 1

PREPARATION OF CORDIERITE AND SPINEL CERAMIC POWDERS

| Powder Number | Sol Used | Particle Size/Morphology Observations on SEM |
|---|---|---|
| 23-xSAM-5 | (Cordierite from UES) | Low magnification (~1000 X): some spheres, fines High magnifications (~5000 X and ~25000 X): fines consist of very small spheres; some have irregular shape. |
| 24-50AM-5 | (Spinel from UES) | Low magnification (~1000 X): few large spheres; fines on large spheres. |

TABLE 1-continued

PREPARATION OF CORDIERITE AND SPINEL CERAMIC POWDERS

| Powder Number | Sol Used | Particle Size/Morphology Observations on SEM |
|---|---|---|
| | | High magnifications (~5000 X and ~25000 X): fines consist of small spheres; many spheres have irregular shape. |

The powders produced were examined using energy dispersive x-ray analysis (EDXA) to determine the atomic percentages of their elemental components. In order to form the desired crystal structures upon calcination, the amorphous powders must contain the required ratios of metallic elements. EDXA results and elemental requirements are given in following Tables 2 and 3.

TABLE 2

EDXA RESULTS AND ELEMENTAL REQUIREMENT FOR POWDER NUMBER: 23-xSAM-5, CORDIERITE

| Trial Number | Elements Required* (atomic percent) | | | Elements Found (atomic percent) | | | | |
|---|---|---|---|---|---|---|---|---|
| | Si | Al | Mg | Si | Al | Mg | Cu | Cl |
| 1 | 45.5 | 36.4 | 18.2 | 42.20 | 49.12 | 8.32 | 0.35 | |
| 2 | | | | 41.42 | 49.04 | 8.44 | 1.10 | |
| 3 | | | | 41.95 | 48.50 | 7.90 | 0.68 | 0.97 |

*for most favoured composition

TABLE 3

EDXA RESULTS AND ELEMENTAL REQUIREMENTS FOR POWDER NUMBER: 24-50AM-5, SPINEL

| Trial Number | Elements Required (atomic percent) | | Elements Found (atomic percent) | | | | | |
|---|---|---|---|---|---|---|---|---|
| | Al | Mg | Al | Mg | Cu | Si | Cl | Ba |
| 1 | 66.67 | 33.33 | 84.09 | 15.21 | 0.70 | | | |
| 2 | | | 81.18 | 14.30 | | | 2.19 | 2.00 | 0.32 |
| 3 | | | 83.21 | 13.09 | | 2.70 | 1.00 | |
| 4 | | | 77.39 | 15.82 | 6.79 | | | |

Example 3

Transformation toughened alumina (TTA) was prepared using zirconia as a toughening agent. The sol had the following composition:

| isobutanol | 34.8 wt % |
| zirconium n-butoxide | 3.8 wt % |
| aluminum-tri-sec-butoxide | 39.7 wt % |
| toluene | 21.7 wt % |

The amount of each alkoxide was selected to yield a mole ratio $AL_2O_3:ZrO_2$ of 9:1. The sol was kept dry by continuous contact with a Type 4A Molecular Sieve.

Figure 8:
FIG. 8 is a scanning electron photomicrograph (SEM) of a sixth sample of ceramic spheres using the process of FIGS. 1 and 2.

Anhydrous sol was introduced into SPHEROL. The sol: SPHEROL ratio was 1:10. Spheres of different sizes were yielded including many sub-micron spheres as seen in the SEM photograph of FIG. 8.

SUMMARY OF DISCLOSURE

In summary of this disclosure, the present invention provides a novel method of producing ceramic spheres employing a sol-gel method, in which an anhydrous hydrophobic sol of ceramic oxide precursors is introduced to an immiscible hydrophilic liquid to form spheres, which then are calcined to the final ceramic sphere. Although preferred embodiments of the invention have been described herein in detail, it will be understood by those skilled in the art that variations may be made thereto without departing from the spirit of the invention or the scope of the appended claims.

What I claim is:

1. A method of producing ceramic spheres suitable for calcination to ceramic powders, which comprises:
   contacting an anhydrous alkanol sol of at least one ceramic oxide precursor with liquid with which said sol is immiscible to form spheres of said sol in said immiscible liquid, and
   hydrolyzing said ceramic oxide precursor in said spheres to form ceramic oxide spheres.

2. The method of claim 1 wherein said spheroidizing step and hydrolysis step are effected sequentially.

3. The method of claim 1 wherein said spheroidizing step and hydrolysis step are effected simultaneously.

4. The method of claim 1 comprising the further steps of recovering said ceramic particles from said immiscible liquid and calcining said recovered particles to form a ceramic powder.

5. The method of claim 1 wherein said anhydrous alkanol sol is contacted with said immiscible liquid by introducing droplets of said sol to a continuous phase of said immiscible liquid.

6. The method of claim 5 wherein said droplets of sol are of colloidal size.

7. The method of claim 5 wherein said immiscible liquid is a hydrophilic liquid containing water and said sol is hydrophobic, whereby such spheroidizing step and hydrolysis step are effected simultaneously.

8. The method of claim 7 wherein said immiscible liquid is a mixture comprising acetonitrile, along with toluene, isopropanol, ethanol and water.

9. The method of claim 8 wherein said immiscible liquid contains up to 5 wt. % of water.

10. The method of claim 1 wherein said ceramic precursor is an alkoxide.

11. The method of claim 10 wherein said ceramic precursor concentration ranges from an alkoxide concentration of about 1 wt. % to about 80 wt. % of said sol.

12. The method of claim 4 wherein said at least one ceramic precursor comprises a mixture of aluminum-tri-sec-butoxide and zirconium n-butoxide, thereby to produce transformation toughened alumina ceramic particles.

13. The method of claim 3 wherein said sol is prepared by dispersing particles of at least one ceramic oxide precursor of colloidal particle size in a alkanol solvent.

14. The method of claim 13 wherein said alkanol has a concentration of from about 20 wt. % to about 99 wt. % of said sol.

15. The method of claim 12 wherein said alkanol solvent further comprises an organic hydrocarbon solvent to render the solvent highly hydrophobic.

16. The method of claim 15 wherein said alkanol solvent comprises isobutanol and toluene.

17. The method of claim 15 wherein said hydrocarbon solvent concentration is from about 12 wt. % to about 40 wt % of said sol.

* * * * *

UNITED STATES PATENT AND TRADEMARK OFFICE
CERTIFICATE OF CORRECTION

PATENT NO. : 5,064,783

DATED : November 12, 1991

INVENTOR(S) : Luckevich

It is certified that error appears in the above-identified patent and that said Letters Patent is hereby corrected as shown below:

On the title page: Title page should be deleted and substitute therefore, the attached title page.

In the Drawing:

The Drawing Sheets, consisting of Figs. 1-9, should be added as shown on the attached pages.

Signed and Sealed this

Sixteenth Day of March, 1993

*Attest:*

STEPHEN G. KUNIN

*Attesting Officer*      Acting Commissioner of Patents and Trademarks

United States Patent [19]
Luckevich

[11] Patent Number: 5,064,783
[45] Date of Patent: Nov. 12, 1991

[54] PRODUCTION OF SPHERICAL CERAMIC POWDERS

[75] Inventor: Lydia M. Luckevich, Etobicoke, Canada

[73] Assignee: Ortech International, Mississauga, Canada

[21] Appl. No.: 520,769

[22] Filed: May 8, 1990

[30] Foreign Application Priority Data

Aug. 1, 1989 [GB] United Kingdom ............ 8917456

[51] Int. Cl.$^5$ .................................. C03C 3/145
[52] U.S. Cl. .................................. 501/12; 423/628; 502/8
[58] Field of Search .............. 501/12; 502/8; 423/625, 423/628

[56] References Cited

U.S. PATENT DOCUMENTS

| 3,943,070 | 3/1976 | Mitsche | 252/448 |
| 3,993,589 | 11/1976 | Andre et al. | 252/429 R |
| 4,273,735 | 6/1981 | Jaques et al. | 264/5 |
| 4,318,896 | 3/1982 | Schoonover | 423/628 |
| 4,911,903 | 3/1990 | Unger et al. | 423/335 |

*Primary Examiner*—William R. Dixon, Jr.
*Assistant Examiner*—Chris Gallo
*Attorney, Agent, or Firm*—Sim & McBurney

[57] ABSTRACT

A sol-gel method is employed to produce ceramic oxide spheres from precursors thereto. An alkanol of the sol precursor(s) is introduced to an immiscible hydrophilic liquid phase to cause spheroidizing of the sol. Moisture, which initially may be present in the immiscible liquid or may subsequently be added, is employed to effect hydrolysis of the precursor to oxide form. The ceramic oxide spheres are recovered from the liquid phase and calcined to their final form.

17 Claims, 9 Drawing Sheets

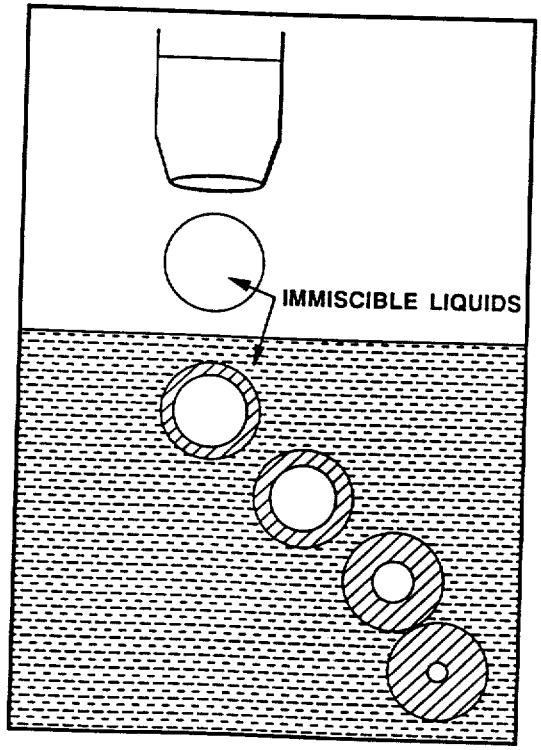

SCHEMATIC DIAGRAM OF SPHEROIDIZING/POLYMERIZATION PROCESS

SCHEMATIC DIAGRAM OF SPHEROIDIZING/POLYMERIZATION PROCESS

☐ ALKOXIDE IN ALCOHOL BASED SOLVENT (ANHYDROUS)

▨ POLYMERIZED ALKOXIDE

▦ SPHEROL

PROCESS FLOW SHEET

SEM PHOTOGRAPH OF POWDER NUMBER P-83AZiii

WATER CONCENTRATION IN SPHEROL: 0%
SPHERES: 0.1 - 1.5 µm
MAGNIFICATION: 20,000X

SEM PHOTOGRAPH OF POWDER NUMBER P-83AZiv

WATER CONCENTRATION IN SPHEROL: 1% v/vol sol
SPHERES: 0.1 - 0.3 μm
MAGNIFICATION: 20,000X

SEM PHOTOGRAPHS OF MULLITE (POWDER NO. 25-60AS-5)
MAGNIFICATION: 850X

MAGNIFICATION: 21,250X
SURFACE OF A LARGE SPHERE IS COVERED WITH SUB-MICRON SIZE SPHERES

HIGH MAGNIFICATION PHOTOGRAPH OF LUMP
REVEALS LUMP CONSISTS OF CLOSELY-PACKED
SUB-MICRON SIZE SPHERES
MAGNIFICATION: 21,250X

SEM PHOTOGRAPHS OF CORDIERITE POWDER: 23-xSAM-5
SPHERES SHOWN RANGE FROM 5 μm TO 11 μm
MAGNIFICATION: 900X

MAGNIFICATION: 22,500X

SEM PHOTOGRAPH OF SPINEL POWDER: 24-50AM-5

MANY SPHERES SHOWN HAVE IRREGULAR SHAPE
MAGNIFICATION: 16,250X

SEM PHOTOGRAPH OF POWDER NUMBER 11(50A)-90AZ-5

ISOBUTANOL CONCENTRATION IN SOL: 34.8 wt.%
WATER CONCENTRATION IN SPHEROL: 5 parts/30 parts sol (vol/vol)
MAGNIFICATION: 7,000X